US010445592B2

(12) United States Patent
Siegl

(10) Patent No.: US 10,445,592 B2
(45) Date of Patent: Oct. 15, 2019

(54) METHOD FOR SURVEILLING A TOLLING SYSTEM

(71) Applicant: Kapsch TrafficCom AG, Vienna (AT)

(72) Inventor: Thomas Siegl, Vienna (AT)

(73) Assignee: Kapsch TrafficCom AG, Vienna (AT)

( * ) Notice: Subject to any disclaimer, the term of this patent is extended or adjusted under 35 U.S.C. 154(b) by 0 days.

(21) Appl. No.: 16/105,216

(22) Filed: Aug. 20, 2018

(65) Prior Publication Data

US 2019/0065860 A1 Feb. 28, 2019

(30) Foreign Application Priority Data

Aug. 25, 2017 (EP) .................................. 17188010

(51) Int. Cl.
| | |
|---|---|
| *G06Q 20/04* | (2012.01) |
| *G06Q 50/30* | (2012.01) |
| *G08G 1/01* | (2006.01) |
| *G07B 15/06* | (2011.01) |
| *H04W 4/40* | (2018.01) |
| *G06F 16/51* | (2019.01) |

(Continued)

(52) U.S. Cl.
CPC ......... *G06K 9/00771* (2013.01); *G06F 16/51* (2019.01); *G06K 9/00785* (2013.01); *G06Q 10/06312* (2013.01); *G06Q 10/10* (2013.01); *G06Q 20/0457* (2013.01); *G06Q 50/30* (2013.01); *G07B 15/063* (2013.01); *G08G 1/0129* (2013.01); *H04W 4/40* (2018.02); *G06K 2209/01* (2013.01); *G06K 2209/15* (2013.01); *G06K 2209/23* (2013.01); *G06Q 2240/00* (2013.01); *H04W 84/042* (2013.01)

(58) Field of Classification Search
None
See application file for complete search history.

(56) References Cited

U.S. PATENT DOCUMENTS

| | | | |
|---|---|---|---|
| 2005/0179776 A1* | 8/2005 | Sasaki .................. | G06K 9/3258 348/148 |
| 2007/0008179 A1* | 1/2007 | Hedley .................. | G07B 15/06 340/928 |

(Continued)

FOREIGN PATENT DOCUMENTS

| | | | |
|---|---|---|---|
| EP | 1975884 A1 * | 10/2008 | ............. G07B 15/04 |
| EP | 3002733 A1 | 4/2016 | |

(Continued)

OTHER PUBLICATIONS

Extended European Search report received for European Patent Application No. 17188010.7, dated Oct. 5, 2017, 8 pages.

*Primary Examiner* — Fernando Alcon
(74) *Attorney, Agent, or Firm* — Fiala & Weaver P.L.L.C.

(57) ABSTRACT

Methods for surveilling a tolling system, in which vehicles carry onboard units and travel on a multilane road on which a surveillance station is set up, are described. A picture of each passing vehicle is taken, and the pictures are stored in a database. In each onboard unit, when the vehicle is within a predefined area of the surveillance station, a tolling message is generated and sent via the mobile network to the tolling server. In the database, those pictures whose timestamp matches the timestamp of a tolling message are deleted if the lane information of this tolling message corresponds to the lane identification of this picture.

10 Claims, 2 Drawing Sheets

(51) Int. Cl.
    *G06K 9/00*         (2006.01)
    *G06Q 10/06*      (2012.01)
    *G06Q 10/10*      (2012.01)
    *H04W 84/04*     (2009.01)

(56) References Cited

U.S. PATENT DOCUMENTS

| | | |
|---|---|---|
| 2012/0215594 A1 | 8/2012 | Gravelle |
| 2015/0104073 A1* | 4/2015 | Rodriguez-Serrano ............... G06F 16/5846 382/105 |
| 2015/0199806 A1 | 7/2015 | Tseng et al. |
| 2016/0055466 A1 | 2/2016 | Du |
| 2017/0124775 A1 | 5/2017 | Breed et al. |

FOREIGN PATENT DOCUMENTS

| | | | | |
|---|---|---|---|---|
| WO | WO-2008076463 A1 * | 6/2008 | ........... | G08G 1/0175 |
| WO | 2012/119255 A1 | 9/2012 | | |

\* cited by examiner

METHOD FOR SURVEILLING A TOLLING SYSTEM

CROSS-REFERENCE TO RELATED APPLICATION(S)

This application claims priority to European Patent Application No. 17 188 010.7, filed Aug. 25, 2017, the disclosure of which is herein incorporated by reference in its entirety.

TECHNICAL FIELD

The present subject matter relates to a method for surveilling a tolling system, in which onboard units carried by vehicles determine their position and communicate tolling information based on the determined positions to a tolling server via a mobile network, the vehicles travelling on a multilane road on which a surveillance station is set up, the surveillance station comprising a camera for each lane.

BACKGROUND

In so-called "infrastructureless" traffic tolling systems, mobile network-based onboard units determine their own positions by means of, e.g., a global navigation satellite system (GNSS) and communicate tolling information based on the determined positions to a tolling server via the mobile network. The onboard units can be either of "thin" or "thick" client type. Thin client onboard units communicate raw or pre-processed position fixes directly to a tolling server or proxy, where the positional data is analyzed by a map matcher or a virtual gantry detection algorithm to determine if the vehicle has used any tollable area. Thick client onboard units are equipped with their own map matcher and autonomously determine whether they use a toll area or not by comparing the GNSS position fixes with map data stored in the map matcher or algorithm. Both types of onboard units are thus able to be used on roads having no infrastructure at all that is related to tolling.

One of the problems encountered in such a system is the detection of vehicles not using onboard units or malfunctioning onboard units. To this end, surveillance stations can be set up that record pictures of passing vehicles and perform an OCR (Optical Character Recognition) process on them to retrieve the vehicle's license plate number (LPN). The license plate number can then be compared with the tolling information the onboard units have sent via the mobile network to the tolling server. All pictures taken have to be stored in local or central databases as evidence against drivers of vehicles that did not use any onboard unit or declared their positions incorrectly. The databases thus have to store an enormous amount of data stemming from the pictures taken, and the OCR-reading process takes up huge computational resources.

SUMMARY

An object of the disclosed subject matter is to overcome the problems of the state of art and create a method for surveilling a multilane tolling system that uses a lower amount of storage for enforcement purposes as well as less computational resources.

This aim is achieved with a method of the aforementioned type, the method comprising the steps of:

in each camera, taking a picture of each passing vehicle and recording a timestamp of taking the picture and a lane identification corresponding to the camera the picture was taken with;

in a database, storing the pictures;

in each onboard unit, when the vehicle is within a predefined area of the surveillance station, generating a tolling message which includes a lane information indicative of the lane the vehicle is travelling on and a timestamp of generating the tolling message, and sending said tolling message via the mobile network to the tolling server; and in the database, deleting those pictures whose timestamp substantially matches the timestamp of a tolling message if the lane information of this tolling message corresponds to the lane identification of this picture.

The disclosed subject matter solves the problem of correlating the pictures taken in the surveillance station with the corresponding tolling records so that only pictures of potential infringers or users who pay the toll via another service are kept for enforcement or tolling. No computationally exhaustive license plate number verifications are necessary, neither manually nor via OCR-reading. This is achieved by including a lane information in the tolling message for correlating the picture taken by a specific lane camera of a vehicle carrying the onboard unit that had sent this tolling message.

By deleting pictures of compliant onboard units, the method saves a significant amount of data storage needed caused by the enormous number of vehicles moving on a multilane road and the high quality of pictures or videos that is needed for enforcement or reliable OCR-readings. The amount of storage in the database can be kept at a minimum when the pictures of onboard units that complied with the tolling system, i.e., that sent a valid tolling message to the tolling server, are deleted shortly after the tolling server receives and evaluates the tolling messages or sends them to a third party for evaluation.

In conventional infrastructure-bound tolling systems based on DSRC (Dedicated Short Range Communication) or RFID (Radio-Frequency Identification), there exists a radio link between the onboard units and stationary DSRC/RFID beacons for each lane so that the correlation between pictures of DSRC/RFID lane beacon cameras and DSRC/RFID tolling messages never posed a problem because the DSRC/RFID tolling messages were always attributable to the lane of the respective DSRC/RFID beacon. The method solves this problem for infrastructureless tolling systems by including lane information via the mobile network for the tolling server to perform the correlation. Moreover, the method further has the advantage that it can be employed in mixed infrastructureless/infrastructure-bound environments, where existing DSRC/RFID beacons with surveillance cameras can be re-used as the cameras of the surveillance station of the disclosed subject matter, as will be described in detail below.

In these embodiments, the system used by the method will be a surveillance station for the infrastructureless onboard units and a standard tolling station for the infrastructure-bound onboard units. A different type of tolling is the so-called video tolling, in which pictures of passing vehicles are taken, license plate numbers are read out from the pictures, and registered users are tolled by means of the license plate numbers. Such systems can also be combined with the method by using the cameras of the video tolling system as the surveillance station of the method.

The surveillance station optionally comprises a camera for each lane of the multilane road to achieve a technically simple solution. In this case, the lane identification corresponds to the camera identification the picture was taken with. Alternatively, the surveillance station could comprise a single camera that captures all lanes of the multilane road, and the global image taken by the camera is then virtually segmented into the pictures of the individual lanes, to which can then be assigned the lane identifications based on the respective virtual segment of the global image. In general, the picture's lane identification corresponds to the lane the vehicle travelled on when passing the surveillance station.

Depending on the type of onboard units used, e.g., thin or thick client onboard units, the lane information is chosen to achieve the best lane matching results with the least computational effort. For thick client onboard units, the tolling messages may optionally comprise already map-matched lane information as the lane information, for example a lane number or relative position of the lane.

For thin client onboard units, the tolling message may optionally comprise an absolute position with a precision lying within the width of the lane as the lane information. The absolute position can stem, for example, from a global navigation satellite system (GNSS) receiver of the onboard unit. To achieve such a high precision, the GNSS receiver of the onboard unit can be supported by additional positional data originating from GNSS support systems like differential GPS, auxiliary positioning beacons, from gyroscopes, inertial measurement systems (IMUs), dead-reckoning systems of the vehicle, from radar, lidar or machine-vision systems of the vehicle or onboard unit, or the like.

In one embodiment, the method comprises the further step of OCR-reading a license plate number from pictures that have not been deleted after a predetermined amount of time after taking. This serves two purposes, namely firstly to retrieve the license plate numbers of infringers for enforcement, e.g., to determine the identity of the vehicle owner, and secondly to determine additional pictures that can be deleted, i.e., those of non-infringers.

To this end, those pictures whose OCR-read license plate number corresponds to a license plate number information included in said tolling message are optionally deleted.

As outlined above, the method can also be deployed in mixed setups with onboard units that do not have the capabilities needed for the method, i.e., "legacy" onboard units that do not include a lane information in their "legacy" tolling messages. Such legacy onboard units can either be of conventional infrastructureless tolling systems with a low precision of positional information or of conventional infrastructure-bound tolling systems such as DSRC onboard units. To be able to delete pictures of tolling-compliant, non-infringing legacy onboard units, the method may comprise the additional step of deleting those pictures whose OCR-read license plate number corresponds to a license plate number information included in a legacy tolling message that was generated by a legacy onboard unit, in embodiments. The step of OCR-reading and deleting pictures of legacy onboard units may be optionally performed after the step of deleting pictures of onboard units according to the method such that the amount of pictures that have to be OCR-read is kept at a minimum.

To also delete pictures of vehicles that do not have compliant onboard units but are nevertheless authorised to use toll roads, the method may comprise the additional step of deleting those pictures whose OCR-read license plate number corresponds to an entry in a predefined list. Thus, the database can be freed-up of pictures comprising license plate numbers of authorised vehicles such as police cars, ambulances, fire trucks, or the like.

There exist various embodiments of distributing the physical components of the systems such as the picture database and the processor that determines the pictures to be deleted. For example, the picture database can be a central database that is part of the tolling server. However, a local database may be kept at each surveillance station to minimize bandwidth requirements for the transmission of pictures from the surveillance stations to the tolling server. In such an embodiment where the database is located at the surveillance station, there exist two variants according to the disclosed subject matter.

In the first variant of the disclosed subject matter, the surveillance station sends only picture meta data comprising an identification of the picture, the timestamp of the picture, and the lane identification of the picture to the tolling server, and it is the tolling server that determines the pictures to be deleted by comparing the received picture meta data to the received tolling messages. The tolling server then sends the identifications of the pictures to be deleted to the surveillance station, which deletes the pictures corresponding to the picture identifications received from the tolling server in its local database. This has the advantage that the data needed for correlation can be transferred to the tolling server without actually transferring the high-quality pictures, which greatly reduces the bandwidth used. Since normally there is a large number of surveillance stations in the tolling system, all the data needed for the correlations can be collected at the tolling server such that all the computations can be performed centrally. This combines the advantages of keeping the pictures stored locally but performing the computations centrally.

In the second variant of the disclosed subject matter, the tolling server sends only the lane information and timestamps of the tolling messages to the surveillance station, and it is the surveillance station that determines the pictures to be deleted by comparing the received lane information and timestamps of the tolling messages to the lane identifications and timestamps of the pictures. The surveillance station then deletes the determined pictures in its local database. Thereby, computations pertaining to the correlations as well as storage can be managed locally within the surveillance station, which makes it more easy to add additional surveillance stations to the tolling system without having to upgrade the tolling server. Also in this embodiment, the bandwidth used can be kept at a minimum since the pictures themselves do not have to be transferred between the entities. If there exist multiple surveillance stations, the tolling server optionally sends the lane information and timestamps only to those surveillance stations that correspond to the lane information to further reduce bandwidth.

BRIEF DESCRIPTION OF THE DRAWINGS

The disclosed subject matter shall now be explained in more detail below on the basis of exemplary embodiments thereof with reference to the accompanying drawings, in which.

DETAILED DESCRIPTION

Figure 1:
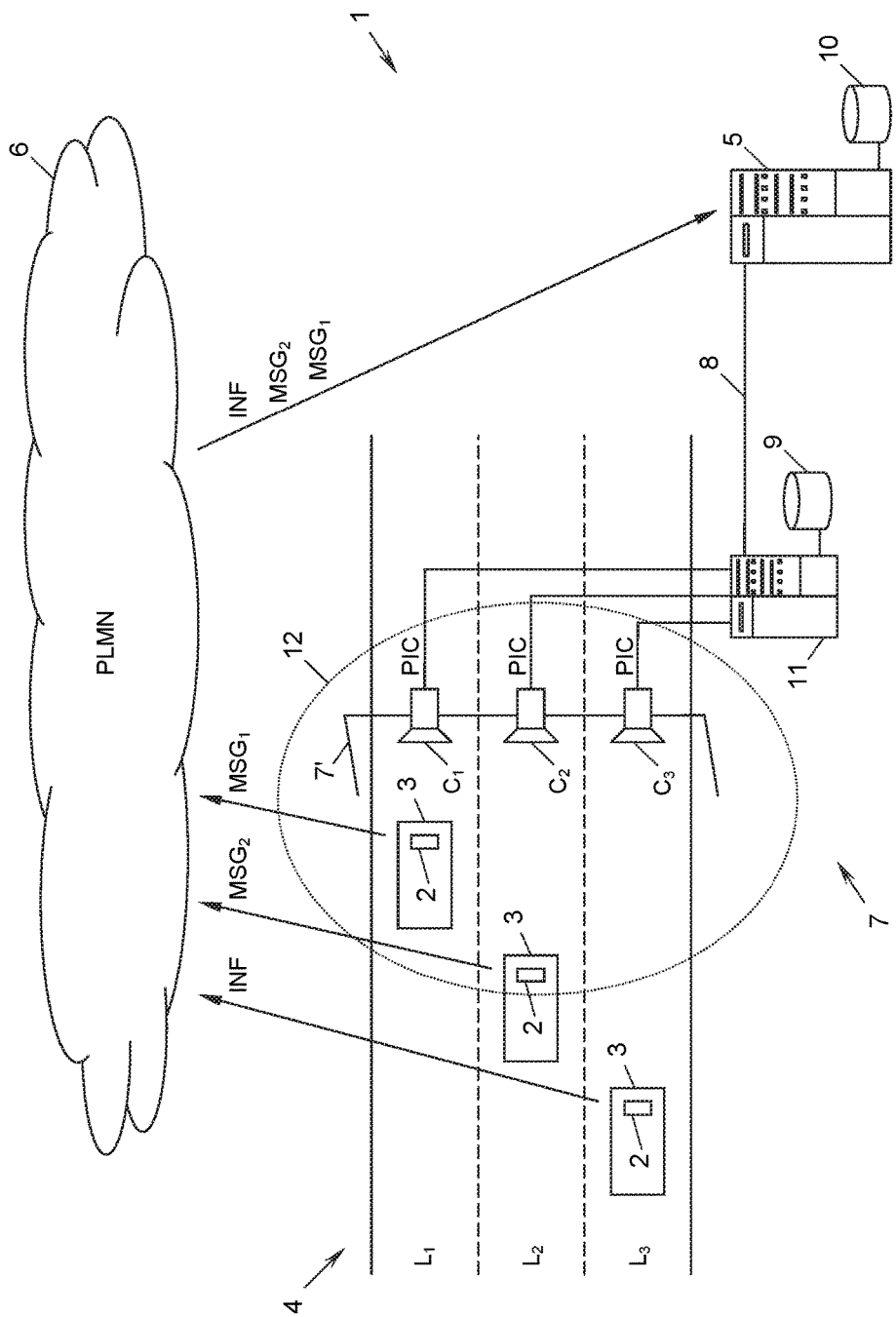
FIG. 1 shows a tolling system implementing a method in a schematic view.

FIG. 1 shows a tolling system 1, in which onboard units 2 carried by vehicles 3 travel on a multilane road 4 having three lanes $L_1$, $L_2$, $L_3$. The multilane road 4 can be part of a network of roads with intersections and a variable amount of lanes, for example having two lanes $L_1$, $L_2$ in a section before the depicted road 4 and six lanes $L_1$, . . . , $L_6$, thereafter, generally having i lanes $L_i$ (i=1, 2, . . . ).

At least part of the roads 4 of the road network are toll roads, meaning that users of vehicles 3 travelling on these toll roads have to pay a toll to the operator of the tolling system 1. To this end, the onboard units 2 communicate with a tolling server 5 via a mobile network 6. For example, the onboard units 2 determine their own positions and communicate tolling information INF, in which they specify the toll road(s) they have used or the positions they have recently visited.

The onboard units 2 may be dedicated tolling onboard units, smartphones, apps running on in-vehicle platforms, tracking & tracing devices, OBD/OBD-2 (on-board diagnostics) dongles, combinations of smartphones and OBD/OBD-2 dongles or in-vehicle platforms, or the like. Generally the onboard-units 2 can have processing power and can communicate to other systems.

To communicate information on which the toll is to be calculated, the onboard units 2 can be either "thin" or "thick" client onboard units. Thin client onboard units 2 send tolling information INF in form of position fixes, either raw or pre-processed, together with corresponding timestamps and an onboard unit identification via the mobile network 6 to the tolling server 5. The tolling server 5 or a third party server evaluating the tolling information INF comprises a map matcher to determine if the onboard units 2 have used any tollable roads 4 by comparing the position fixes with toll map data stored in the map matcher. On the other hand, thick client onboard units comprise their own map matcher, into which a determined position fix or trajectory of position fixes is input to determine whether they currently use or have used a tollable road 4. Alternatively, thick client onboard units 2 can comprise virtual gantry detection algorithms to determine if they enter a tollable area. The tolling information INF sent to the tolling server 5 via the mobile network 6 then comprises, for example, a number or identification of the road 4 they are using or have used together with timestamps of usage and an identification of the onboard unit 2.

The mobile network 6 mentioned above can be of any type known in the state of the art, for example a public land mobile network (PLMN) using GSM (Global System for Mobile Communications), UMTS (Universal Mobile Telecommunications System), or LTE (Long Term Evolution), or even a satellite based mobile network such as Iridium or Globalstar.

To monitor if all vehicles 3 are using functional onboard units 2, a surveillance station 7 is set up on a part of the multilane road 4. A plurality of surveillance stations 7 can be set up within the road network 1, and each surveillance station 7 is connected to the tolling server 5 via a connection 8 or via the mobile network 6 for the purposes described below.

The surveillance station 7 comprises a gantry 7', on which for each lane $L_i$ a camera $C_i$ is mounted. Each camera $C_i$ is capable of taking a picture PIC of a passing vehicle 3 on its lane $L_i$, optionally in a way that a license plate number LPN of a passing vehicle 3 is visible on the picture PIC.

In operation, each camera $C_i$ takes a picture PIC of each passing vehicle 3 and records a timestamp $t_{pic}$ of taking the picture PIC and a lane identification $L_{id}$ corresponding to the camera $C_i$ the picture PIC was taken with. The timestamp $t_{pic}$ and the lane identification $L_{id}$ can be stored as part of a meta data MD (FIG. 2) of the picture PIC to alleviate further processing.

While each camera $C_i$ at least takes one picture PIC, they can also be configured to record sequences of pictures PIC as a video that may only have one timestamp $t_{pic}$, e.g., of the start of taking the video, or timestamps $t_{pic}$ for each picture of the video. Naturally, the pictures PIC of a video were taken by the same camera $C_i$ and thus the video only has one lane identification $L_{id}$.

Instead of employing a camera $C_i$ for each lane $L_i$, the surveillance station 7 could comprise a single camera (not shown in FIG. 1) that captures all lanes $L_i$ of the multilane road 4 in a global image, which can be virtually segmented into the individual pictures PIC of the individual lanes $L_i$. If for example two vehicles pass the surveillance station 7 at the same time, the single camera takes only one image and extracts therefrom two pictures PIC that each comprise one vehicle 3 on a lane $L_i$. The rest of the global image, which might also contain "empty" lanes $L_i$, i.e., lanes $L_i$ without vehicles 3, can then be discarded. The individual pictures PIC are then assigned the lane identifications $L_{id}$ based on the respective virtual segment of the global image, i.e., the lane identification $L_{id}$ that corresponds to the lane $L_i$ the vehicle 3 travelled on when passing the surveillance station 7.

The pictures PIC taken by the cameras Ci are stored in a local database 9 of the surveillance station 7 or in a central database 10 at the tolling server 5 or at a third party server by sending the pictures PIC from the surveillance station 7 via the connection 8 or mobile network 6 to the tolling server 5 or said third party server. In order to manage the storage of pictures PIC in the local database 9 and the control of cameras Ci, the surveillance station 7 is equipped with a computing unit 11, which optionally performs image processing on the pictures PIC to reduce their storage size before storing in the database 9, 10.

In order to achieve a correlation between pictures PIC and the vehicles 3 that have entered the surveillance station 7, the onboard units 2 of the vehicles 3 generate tolling messages $MSG_1$, $MSG_2$, . . . , generally $MSG_j$, and send them to the tolling server 5 via the mobile network 6 when the vehicle 3 is within a predefined area 12 of the surveillance station 7. Each tolling message $MSG_j$ comprises at least a lane information $L_{inf}$ (FIG. 2) indicative of the lane $L_i$ the vehicle 3 is travelling on and a timestamp $t_{msg}$, which indicates the time of generating the tolling message $MSG_j$. The tolling message $MSG_j$ can further include data such as an identification of the onboard unit 2 or the vehicle 3, e.g., a license plate number information $LPN_{inf}$.

The tolling message $MSG_j$ can be part of the regular tolling information INF or separate therefrom. For example, if a thin client onboard unit 2 sends tolling information INF continuously or at least in sufficiently small intervals to the tolling server 5, the tolling message $MSG_j$ can be identical to the tolling information INF, as its "granularity" or positional resolution, respectively, is then sufficient to indicate the entering into the predefined area 12. On the other hand, thick client onboard units, for example, send tolling information INF rarely so that the onboard units 2 in most cases would not send a tolling information INF just when they reach the surveillance station 7. For this purpose, onboard units 2 can detect when they enter the predefined area 12 either by a geographical identification within the internal map matcher or the virtual gantry detection algorithm of the onboard unit 2 or by different activation means, e.g., a wireless communication message such as Bluetooth, as a trigger for generating the tolling message $MSG_j$. Depending on the type of onboard unit 2 used, there can be any arbitrary delay between generating the tolling message $MSG_j$ upon detection of the predefined area 12 and sending this tolling message $MSG_j$ to the tolling server 5.

The lane information $L_{inf}$ indicated in the tolling message $MSG_j$ can be different for each type of onboard unit employed as long as the lane information $L_{inf}$ allows for a determination of the lane $L_i$ the vehicle 3 is travelling on with a predefined accuracy, e.g., >80%. For example, lane information $L_{inf}$ can be a map-matched lane information that the onboard unit 2 determines from its internal map matcher and is then available in the form of a lane number, a relative lane position (left lane, middle lane, . . . ), or the like. Alternatively, the lane information $L_{inf}$ can be an absolute position with a precision lying within the width of a lane such that the tolling server 5 or a third party can therefrom determine the lane $L_i$ the vehicle 3 is using with a sufficient accuracy.

After receiving the tolling messages $MSG_j$ in the tolling server 5, either in the tolling server 5, in the computing unit 11 of the surveillance station 7 (if there exists a plurality of surveillance stations 7, the computations can optionally be split up amongst the individual surveillance stations 7), or in a third party server, a correlation between the tolling messages $MSG_j$ and pictures PIC is performed to identify pictures PIC that can be deleted in the databases 9, 10. Pictures PIC that can be deleted can be pictures PIC of vehicles 3 that have either paid the toll or are exempt from paying the toll, as will be described below by means of FIG. 2.

Figure 2:
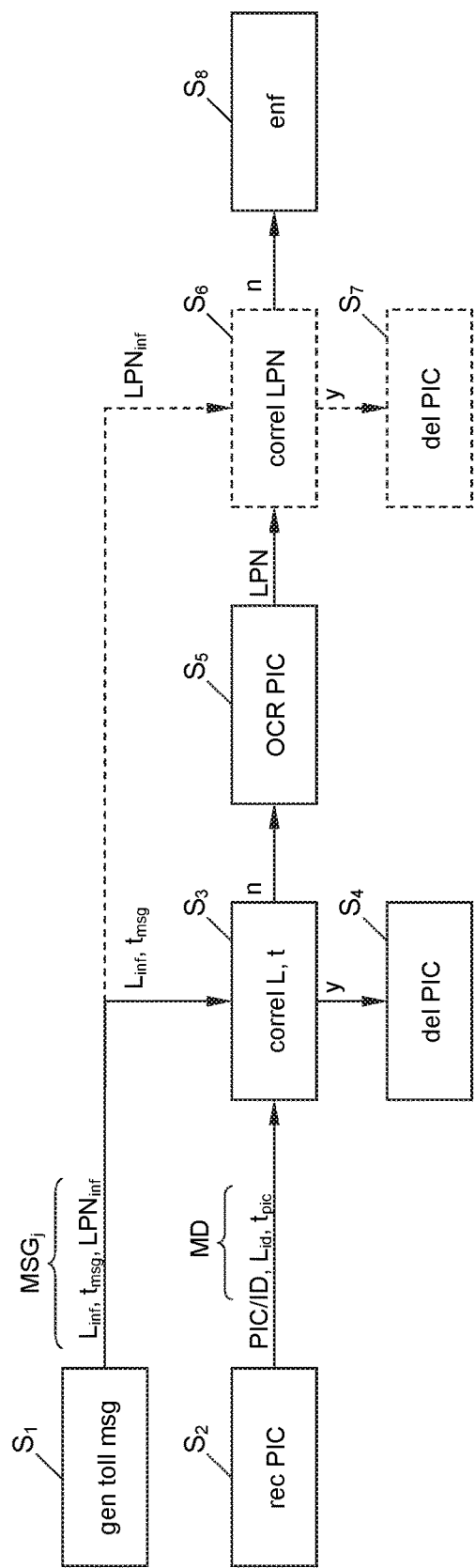
FIG. 2 shows the method in a block diagram.

FIG. 2 shows the method of the disclosed subject matter, which will firstly be laid out for the case in which the pictures PIC are stored in the local database 9 of the surveillance station 7 and the correlation is performed in the tolling server 5.

The steps of generating the tolling message $MSG_j$ by the onboard unit 2 and taking the picture PIC by the camera $C_i$, as just explained by means of FIG. 1, are shown as initial steps $S_1$ and $S_2$ in FIG. 2. To perform the correlation between the tolling messages $MSG_j$ and pictures PIC in the tolling server 5 in step $S_3$, data pertaining to the pictures PIC has to be transferred to the tolling server 5. To this end, the surveillance station 7 sends picture meta data MD comprising the timestamp $t_{pic}$ of the picture PIC, the lane identification $L_{id}$ of the picture PIC, and an identification ID of the picture PIC to the tolling server 5 via the connection 8 or alternatively via the mobile network 6. Thereafter, the tolling server 5 determines the pictures PIC to be deleted by comparing the received picture meta data MD to the received tolling messages $MSG_j$ in step $S_3$.

If the correlation in step $S_3$ is successful (branch "y"), i.e., if the timestamp $t_{pic}$ of a picture PIC substantially matches the timestamp $t_{msg}$ of a tolling message $MSG_j$ and if the lane information $L_{inf}$ of the same tolling message $MSG_j$ corresponds to the lane identification $L_{id}$ of the same picture PIC, the corresponding picture PIC will be deleted in the database 9 in step $S_4$. "Substantially matches" here means that the absolute value of the difference of the timestamp $t_{pic}$ of the picture PIC and the timestamp $t_{msg}$ of the tolling message $MSG_j$ lies below a predefined threshold. In the described embodiment of sending picture meta data MD instead of the actual picture PIC from the surveillance station 7 to the tolling server 5, the tolling server 5 returns the identifications ID of the pictures PIC to be deleted to the surveillance station 7, which then deletes the pictures PIC corresponding to the received picture identifications ID from the database 9 in step $S_4$.

If, on the other hand, all pictures PIC are kept in the database 10 of the tolling server 5, instead of picture meta data MD, the actual pictures PIC together with the timestamps $t_{pic}$ and lane identifications $L_{id}$ have been sent to the tolling server 5. In this case, in step $S_4$ the tolling server 5 can immediately delete the pictures PIC determined in the correlation step $S_3$.

Alternatively to the embodiments detailed above in which the tolling server 5 performs the correlation, the correlation of step $S_3$ can be performed at the surveillance station 7 by its computing unit 11. In this case there is no need to transfer pictures PIC or picture meta data MD from the surveillance station 7 to the tolling server 5 but rather the tolling server 5 sends the tolling messages $MSG_j$ received—or at least the lane informations $L_{inf}$ and timestamps $t_{msg}$ of the tolling messages $MSG_j$ received—back to the surveillance station 7. Since usually there exists a multitude of surveillance stations 7, the tolling server optionally sends the tolling messages $MSG_j$ or the lane information $L_{inf}$ and timestamps $t_{msg}$, respectively, only to those surveillance stations 7 that correspond to the lane information $L_{inf}$ to reduce bandwidth needs for the connections 8.

According to a further embodiment, also in the case where the correlations are performed in the surveillance station 7, the pictures PIC could in principle be kept at the database 10 of the tolling server 5 or a third party server. Here, the surveillance station 7 sends, after the correlating in step $S_3$, the pictures PIC or the identifications ID of the pictures PIC to be deleted to the tolling server 5 or third party server, which then deletes the pictures PIC from its database 10 in step $S_4$.

In all of the embodiments described above, if there remain undeleted pictures PIC (branch "n" of correlation step $S_3$) in the database 9, 10 after a predetermined amount of time, e.g., a time period that usually allows for the correlation and deletion steps $S_3$ and $S_4$, a manual enforcement step $S_8$ can be performed, in which an operator uses the pictures PIC to identify and prosecute the owner of the vehicles 3 that did not use complying onboard units 2, i.e., did not pay the toll. Alternatively, after said predetermined amount of time an OCR-reading could be performed in a subsequent (optional) step $S_5$, for an automatic enforcement in the later enforcement step $S_8$, and/or for an optional determination of additional pictures PIC to be deleted in further optional steps $S_6$ and $S_7$ detailed later on.

The step $S_5$ of OCR-reading is optionally performed within the same entity in which the pictures PIC are stored to reduce the data transfer within the tolling system 1, but generally the OCR-reading $S_5$ can by performed in the tolling server 5, the surveillance station(s) 7, or a third party server.

Onboard units 2 can be configured to include a license plate number information $LPN_{inf}$ indicative of the vehicle 3 they are carried by, which can be the license plate number LPN, an insurance number linked to the license plate number LPN by means of a list stored in the tolling server 5, or the like. If this is the case, in step $S_6$ a correlation between the license plate number LPN read out in step $S_5$ from the undeleted pictures PIC and the LPN information $LPN_{inf}$ in the tolling message $MSG_j$ received from step $S_1$ can be made. Step $S_6$ can be performed either within the surveillance station 7, the tolling server 5 or a third party server, optionally by having the OCR-read license plate number LPN included in the picture meta data MD as described above, if necessary. If the license plate number information $LPN_{inf}$ of a tolling message $MSG_j$ can be correlated to a license plate number LPN of an OCR-read picture PIC (branch "y" of step $S_6$), then this picture PIC will be deleted in step $S_7$.

If after another predetermined amount of time there still remain undeleted pictures PIC (branch "n" of correlation step $S_6$) in the database 9, 10, in the step $S_8$ the enforcement process to prosecute toll evaders or to invoice toll road users who chose to be tolled based on their recognised license plate number can be started. This can be done by evaluating the undeleted pictures PIC manually or automatically by means of the license plate number LPN retrieved from the OCR-reading in step $S_5$.

The tolling system 1 may also comprise legacy onboard units such as infrastructureless (mobile network-based) onboard units that cannot determine their position accurately enough or infrastructure-bound onboard units such as DSRC (Dedicated Short Range Communication) or RFID (Radio-Frequency Identification) onboard units. DSRC onboard units for tolling systems usually use the 5.8 or 5.9 GHz frequency band while RFID onboard units for tolling systems typically use the 915 MHz frequency band. The OCR-reading, correlation, and deletion steps $S_5$-$S_7$ can in this case still be performed—even without the preceding correlation and detection steps $S_3$ and $S_4$—if these legacy onboard units are configured to send legacy tolling messages including a license plate number information $LPN_{inf}$ when the legacy onboard unit enters the predefined area 12. If a license plate number information $LPN_{inf}$ indicated in such a legacy tolling message can be successfully correlated in step $S_6$ to a license plate number LPN read out by OCR in step $S_5$, the respective picture PIC will also be deleted in step $S_7$.

Sometimes, there may be vehicles 3 of authorized users such as police cars, ambulances, fire trucks, et cet., which do not carry valid onboard units 2 but shall still not be enforced as infringers. Pictures PIC of those vehicles 3 can then also be deleted in step $S_7$ if the OCR-read license plate number LPN of an undeleted picture PIC corresponds to an entry in a predefined list. The predefined list can be kept either centrally in the tolling server 5 or locally in the surveillance stations 7.

CONCLUSION

The disclosed subject matter is not restricted to the specific embodiments described in detail herein, but encompasses all variants, combinations, and modifications thereof that fall within the scope of the appended claims.

What is claimed is:

1. A method for surveilling a tolling system, in which onboard units carried by vehicles determine their position and communicate tolling information based on the determined positions to a tolling server via a mobile network, the vehicles travelling on a multilane road on which a surveillance station is set up, the method comprising:

in the surveillance station, taking a picture of each vehicle passing on a lane of the multilane road and recording a timestamp of taking the picture and a lane identification of the picture;

in a database, storing the pictures;

in each onboard unit, when the vehicle is within a predefined area of the surveillance station, generating a tolling message which includes a lane information indicative of a lane the vehicle is travelling on and a timestamp of generating the tolling message, and sending said tolling message via the mobile network to the tolling server; and in the database, deleting those pictures whose timestamp substantially matches the timestamp of a tolling message if the lane information of this tolling message corresponds to the lane identification of this picture.

2. The method according to claim 1, wherein the tolling message comprises a map-matched lane information as the lane information.

3. The method according to claim 1, wherein the tolling message comprises an absolute position with a precision lying within a width of a lane as the lane information.

4. The method according to claim 1, comprising a step of OCR-reading a license plate number from pictures that have not been deleted after a predetermined amount of time after taking.

5. The method according to claim 4, comprising a step of deleting those pictures whose OCR-read license plate number corresponds to a license plate number information included in a tolling message.

6. The method according to claim 4, comprising a step of deleting those pictures whose OCR-read license plate number corresponds to a license plate number information included in a legacy tolling message that was generated by a legacy onboard unit that does not include a lane information in said legacy tolling message.

7. The method according to claim 4, comprising a step of deleting those pictures whose OCR-read license plate number corresponds to an entry in a predefined list.

8. The method according to claim 1, wherein the database is located at the surveillance station.

9. The method according to claim 8, wherein the surveillance station sends picture meta data comprising an identification of the picture, the timestamp of the picture and the lane identification of the picture to the tolling server, wherein it is the tolling server that determines the pictures to be deleted by comparing the received picture meta data to the received tolling messages, and wherein the tolling server sends the identifications of the pictures to be deleted to the surveillance station, which deletes the pictures corresponding to the picture identifications received from the tolling server.

10. The method according to claim 8, wherein the tolling server sends at least the lane informations and timestamps of the tolling messages to the surveillance station, and wherein it is the surveillance station that determines the pictures to be deleted by comparing the received lane informations and timestamps of the tolling messages to the lane identifications and timestamps of the pictures.

\* \* \* \* \*